(12) United States Patent
Hattori et al.

(10) Patent No.: US 7,939,977 B2
(45) Date of Patent: May 10, 2011

(54) ROTARY ELECTRICAL DEVICE HAVING PARTICULAR COIL SUPPORT STRUCTURE

(75) Inventors: Kenichi Hattori, Hitachiota (JP); Tadaaki Kakimoto, Hitachi (JP); Akitomi Semba, Hitachi (JP); Mitsuru Saeki, Hitachinaka (JP); Takashi Shibata, Hitachi (JP); Manabu Suzuki, Hitachi (JP); Naomi Okamoto, Takahagi (JP)

(73) Assignee: Hitachi, Ltd., Tokyo (JP)

( * ) Notice: Subject to any disclaimer, the term of this patent is extended or adjusted under 35 U.S.C. 154(b) by 477 days.

(21) Appl. No.: 11/656,414

(22) Filed: Jan. 23, 2007

(65) Prior Publication Data
US 2007/0222333 A1 Sep. 27, 2007

(30) Foreign Application Priority Data
Mar. 27, 2006 (JP) .................. 2006-084439

(51) Int. Cl.
*H02K 3/24* (2006.01)
*H02K 9/00* (2006.01)
(52) U.S. Cl. .............. 310/59; 310/58; 310/61; 310/270
(58) Field of Classification Search .............. 310/270, 310/60 A, 60 R, 59, 61, 58, 65, 260
See application file for complete search history.

(56) References Cited

U.S. PATENT DOCUMENTS

| | | | | |
|---|---|---|---|---|
| 3,831,050 A | * | 8/1974 | Laskaris ................. | 310/270 |
| 4,656,382 A | * | 4/1987 | Moore et al. ............ | 310/270 |
| 6,087,745 A | * | 7/2000 | Dreher ..................... | 310/58 |
| 6,204,580 B1 | * | 3/2001 | Kazmierczak ........... | 310/52 |
| 6,346,754 B1 | * | 2/2002 | Kieda et al. ............. | 310/58 |
| 6,870,299 B1 | * | 3/2005 | Moeleker et al. ........ | 310/270 |
| 2002/0079753 A1 | * | 6/2002 | Turnbull et al. ......... | 310/61 |

FOREIGN PATENT DOCUMENTS

| | | | | |
|---|---|---|---|---|
| DE | 4021861 A | * | 1/1992 | |
| JP | 07075272 A | * | 3/1995 | |
| JP | 09051655 A | * | 2/1997 | |
| JP | 10112947 A | * | 4/1998 | |
| JP | 2000-350412 | | 12/2000 | |

OTHER PUBLICATIONS

Machine translation of JP 07075272 A , Mar. 1995.*
Takayama et al., JP 10112947 Machine Translation, 1998.*

* cited by examiner

*Primary Examiner* — Quyen Leung
*Assistant Examiner* — Eric Johnson
(74) *Attorney, Agent, or Firm* — Brundidge & Stanger, P.C.

(57) ABSTRACT

A rotor for a rotary electrical device to be arranged to face to a stator, comprises a rotor iron core extending axially and including a plurality of slots arranged with a predetermined circumferential interval, a rotor coil contained by the slots, a coil support member of electrically insulating property arranged between parts of the rotor coil at an axial end of the rotor coil, and a retaining ring covering the coil support member and the axial end of the rotor coil, the coil support member has two fitted portions and a connecting portion connecting the fitted portions to each other to form H-shape of cross section and to form a space between the rotor coil and each of opposite sides of the connecting portion, and the coil support member further has a communicating path communicating to the spaces.

8 Claims, 5 Drawing Sheets

ROTARY ELECTRICAL DEVICE HAVING PARTICULAR COIL SUPPORT STRUCTURE

BACKGROUND OF THE INVENTION

The present invention relates to a rotor for an rotary electrical device suitable as, for example, a rotor for a turbine-driven generator including an air flow path enabling a cooling wind to flow on an electrically conductive member forming an axial end of a rotor coil to be cooled.

The turbine-driven generator includes a stator and the rotor supported on a rotary shaft and facing to the stator. A central iron core of the rotor extends axially and includes a plurality of slots arranged to have a predetermined circumferential distance between adjacent ones thereof so that the electrically conductive members forming the rotor coil are stacked to be received in the slots. The electrically conductive members are fixed to the central iron core by wedges being arranged at a radially outer side of the slots and capable of holding the electrically conductive members at a high rotational speed.

A retaining ring is fitted on the axial end of the rotor coil to be covered through an insulating tube so that the electrically conductive members are held radially by the retaining ring.

In the prior art, since there is no flow path enabling a cooling wind to flow securely in the vicinity of the electrically conductive members under the retaining ring, a temperature of such a position becomes high. As a means for decreasing the temperature at such a position, an air flow groove enabling the cooling wind to flow on the electrically conductive members was proposed, and the air flow groove is formed by a coil support member made of an insulating substance and arranged between the adjacent ones of the electrically conductive members to have the predetermined distance therebetween under the retaining ring so that the cooling wind flows through the air flow groove to cool the electrically conductive members under the retaining ring.

Such prior art is disclosed by JP-A-2000-350412.

BRIEF SUMMARY OF THE INVENTION

In the prior art disclosed by JP-A-2000-350412, the temperature of the rotor coil cannot be decreased efficiently.

That is, since the rotor of the rotary electric device rotates at a high speed of 3000 rpm, 3600 rpm or the like during a normal working condition, a refrigerant is introduced onto the rotor coil to be cooled through a clearance between the retaining ring and the rotary shaft from a space between the rotor and the stator. The refrigerant is not supplied to the rotor in a direction parallel to the axial direction, but is supplied thereto usually with a certain rotating component thereof.

An air intake angle varies in accordance with an amount of the refrigerant on the rotor, a structure of the stator, a flow rate of the refrigerant in the stator and so forth. A rotating speed of the rotor coil is $\pi \times 3600/60 \times 1 = 188$ m/s when a power generator has a diameter of 1 m and rotates at 3600 rpm. When it is assumed that the refrigerant has no circumferential speed in the space between the rotor and the stator, the refrigerant has a relative circumferential speed of 188 m/s as seen from the rotor. Since an axial speed of the refrigerant at this position is usually about 10-20 m/s, the refrigerant is introduced in a direction close to a perpendicular direction with respect to the axial direction.

The invention is based on a defect of the above structure, and an object of the present invention is to provide a rotor of a rotary electrical device in which a cooling performance for a rotor coil is improved.

According to the invention for achieving the above object, a rotor for a rotary electrical device to be arranged to face to a stator, comprises a rotor iron core extending axially and including a plurality of slots arranged with a predetermined circumferential interval, a rotor coil contained by the slots, a coil support member of electrically insulating property arranged between parts of the rotor coil at an axial end of the rotor coil, and a retaining ring covering the coil support member and the axial end of the rotor coil, the coil support member has two fitted portions and a connecting portion connecting the fitted portions to each other to form H-shape of cross section and to form a space between the rotor coil and each of opposite sides of the connecting portion, and the coil support member further has a communicating path communicating to the spaces.

The rotor for the rotary electrical device of the invention has an advantage of that a rotating component of a cooling wind is used to form a secure flow path of the cooling wind so that a cooling of a side surface of the coil for restraining a temperature increase is accelerated to improve a cooling performance for the rotor coil.

Other objects, features and advantages of the invention will become apparent from the following description of the embodiments of the invention taken in conjunction with the accompanying drawings.

DETAILED DESCRIPTION OF THE INVENTION

Hereafter, embodiments of the invention will be described with making reference to the drawings.

Figure 9:
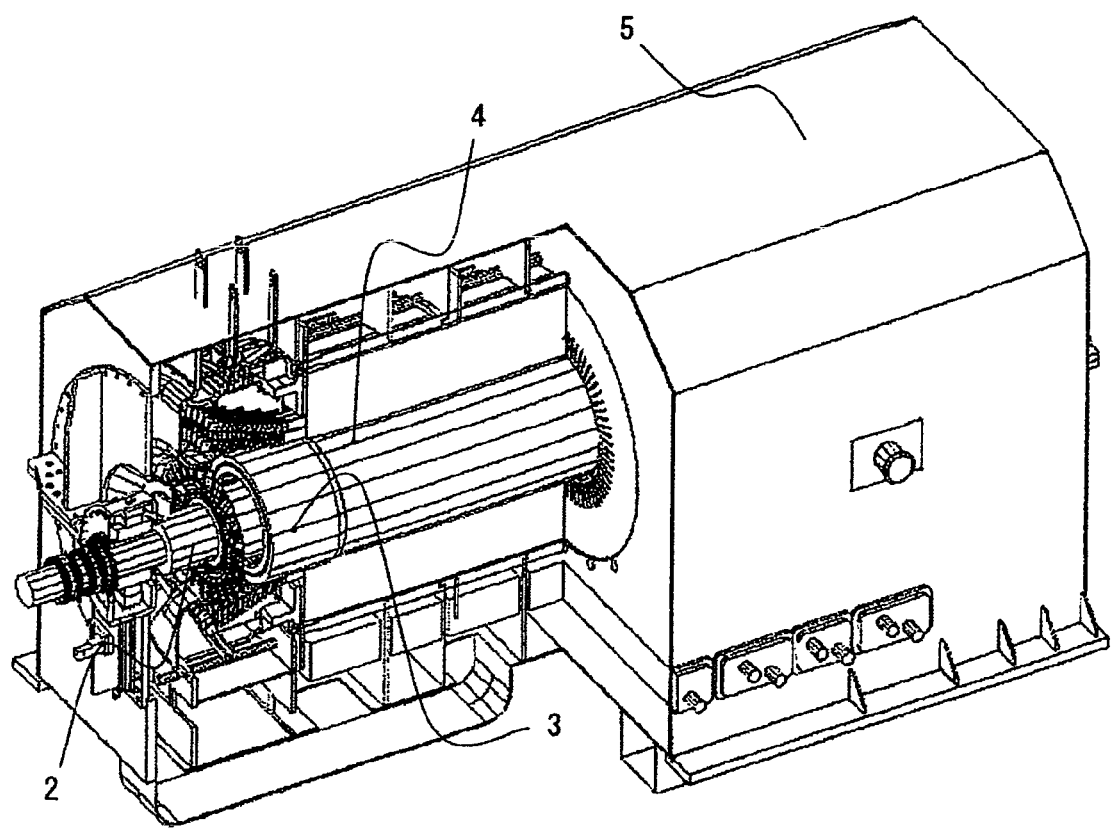
FIG. 9 is a partially cross sectional view of a turbine-driven generator as an example of the invention.
Figure 10:
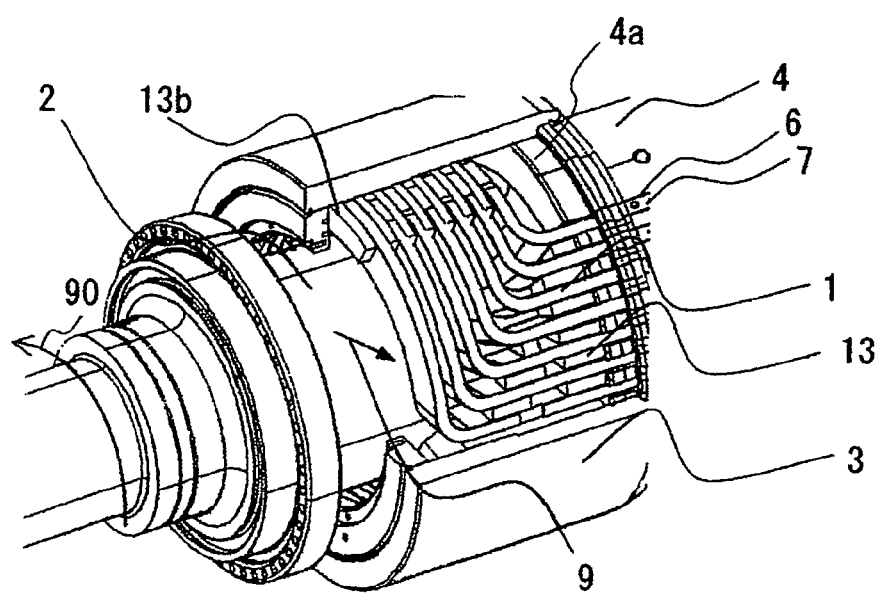
FIG. 10 is an oblique projection view showing the axial end of the rotor coil of the invention.

A structure of a turbine-driven generator to which a rotor for a rotary electrical device of the invention is applied, is shown in FIGS. 9 and 10.

As shown in those drawings, the turbine-driven generator has a stator 5 and a rotor 4 supported on a rotary shaft 2 and facing to the stator 5. A rotor iron core 4a of the rotor 4 extends axially and has a plurality of slots 6 arranged with a predetermined circumferential interval so that a plurality of electrically conductive members are stacked in the slots 6 to form a rotor coil 1. The rotor coil 1 is fixed to the rotor iron core 4a by wedges 7 arranged on radially outer sides of the slots 6 so that the wedges 7 held the rotor coil when being rotated at a high speed. Further, at an end of the rotor coil 1, coil support members 13 for keeping a circumferential electrical insulation and coil support members 13b for keeping an axial electrical insulation are arranged, and an axial end of the rotor coil 1 is covered by a retaining ring 3 arranged through the coil support members 13 and 13b so that the rotor coil 1 is supported radially by the retaining ring 3.

Figure 1:
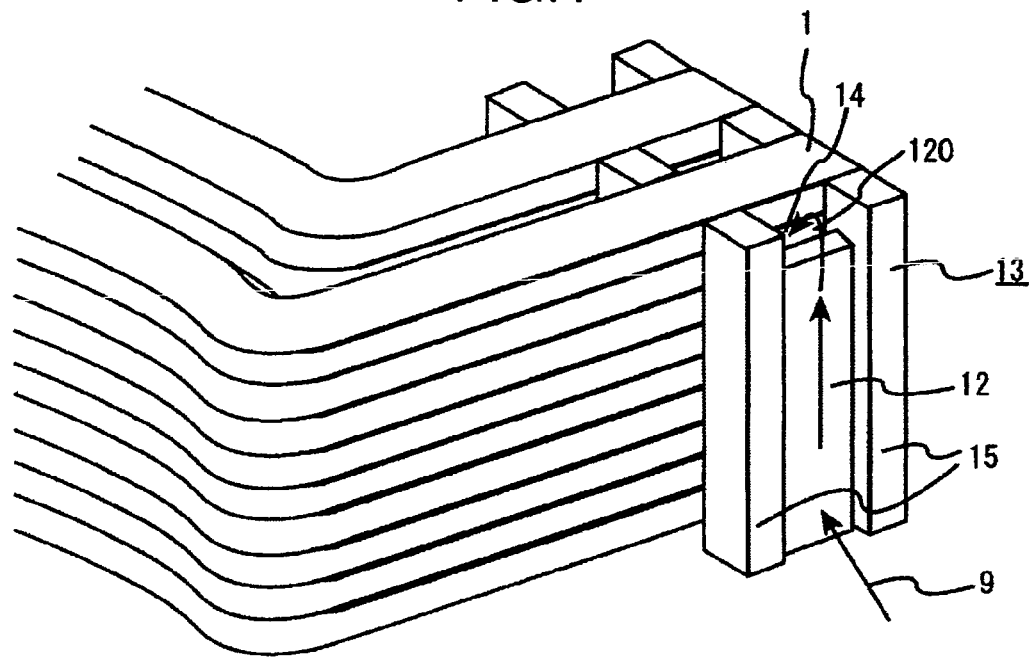
FIG. 1 is an oblique projection view showing an axial end of a rotor coil in a turbine-driven generator as a first embodiment of a rotor for a rotary electrical device of the invention.

The above mentioned coil support member 13 is, as shown in FIG. 1 (FIG. 1 is an example in which the coil support members 13 are arranged circumferentially at the axial end of the rotor coil 1.), formed monolithically to have H-shape cross section by two compressed parts 15 and a connecting part 12 as an intermediate portion therebetween, and opposite sides of the connecting part 12 and the rotor coil 1 adjacent thereto form spaces 11 and 14 therebetween, while in this embodiment, a radially outer end of the connecting part 12 is shorter than a radially outer end of the compressed parts 15 to form a communication path 120 communicating with spaces 11 and 14 adjacent thereto.

Figure 2:
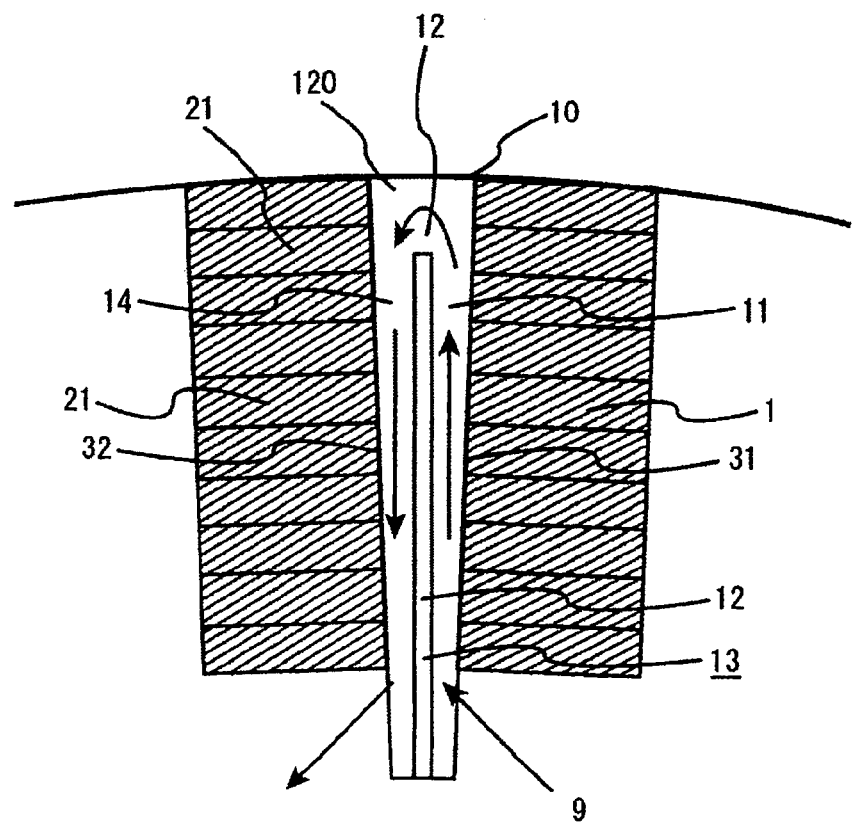
FIG. 2 is a cross sectional view of FIG. 1.

The coil support member 13 of this shape is arranged between parts of the rotor coil 1 to form the spaces 11 and 14 as cooling wind grooves between the parts of the rotor coil 1 and the opposite sides of the connecting part 12 respectively, and a communication path 120 enables the cooling wind to flow as shown in FIG. 2. FIG. 2 is a view showing a cross section as seen axially in the vicinity of the coil support member 13 shown in FIG. 1.

As shown in that drawing, the cooling wind 9 introduced with the rotating component collides with the connecting part 12 of the coil support member 13 and proceeds into the space 11. At this situation, the cooling wind which has cooled a coil side surface 31 of the rotor coil 1 flows into the space 14 through the communication path 120 to cool a coil side surface 32 of another part 21 of the rotor coil in another slot, and is discharged from a radially inner side again.

Figure 3:
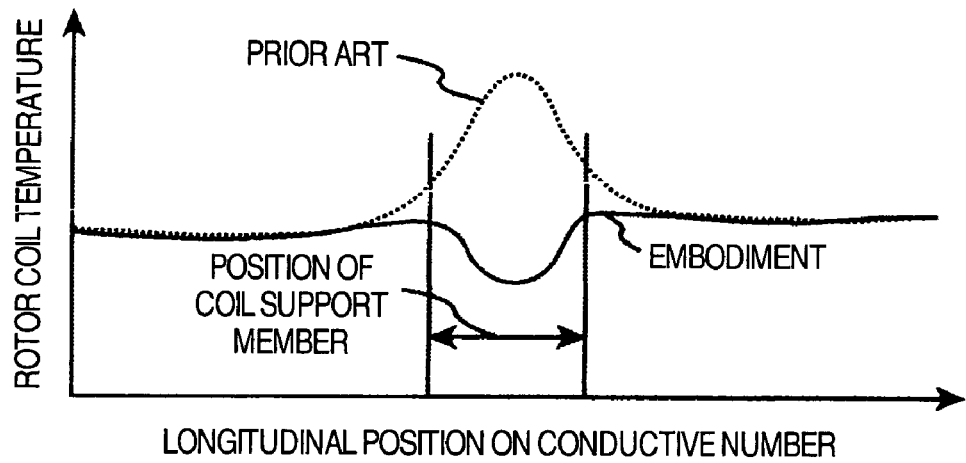
FIG. 3 is a diagram showing a relationship between a longitudinal position of the electrically conductive member and a temperature of the rotor coil in each of the embodiment 1 of the invention and the prior art.

Next, an effect of the embodiment will be explained with making reference to FIG. 3. FIG. 3 is a relationship between a longitudinal position of the electrically conductive member and a temperature of the electrically conductive member of the rotor in each of the embodiment and JP-A-2000-350412 to be compared with each other.

As clarified from the drawing, the temperature of the rotor coil is abruptly increased at the position of the coil support member in the prior art, but the temperature of the rotor coil is decreased to improve a temperature characteristic at the position of the coil support member in the embodiment where the coil support member is improved in cooling performance.

In a structure of such embodiment, the cooling wind can be flow while effectively using the rotating energy of the fluid so that the temperature of the rotor coil 1 can be decreased effectively to improve the cooling performance.

Further, in this embodiment, as shown in FIG. 2, a radially inner peripheral surface of the coil support member 13 is arranged at a radially inner side of a radially innermost bottom of the rotor coil 1 to increase a flow rate of the cooling wind flowing into the space 11, but if the radially inner peripheral surface of the coil support member 13 is arranged at the radially same position as the radially innermost bottom of the rotor coil 1, an improvement in introducing the cooling wind into the spaces 11 and 14 and the communication path 120 and cooling performance can be expected somewhat.

Incidentally, the coil support member 13 is usually made of an insulative material for the electrical insulation, and is preferably made of a high thermal conductivity material for improving the cooling performance. Particularly, it is preferable that the connecting part 12 prevented from contacting the coil is made of an electrically conductive material such as metal or the like higher in thermal conductivity than the compressed parts 15. By increasing the thermal conductivity of the connecting part 12, a temperature distribution of the cooling wind through the spaces 11 and 14 is made even to make a temperature distribution of the rotor coil even.

Embodiment 2

Figure 4:
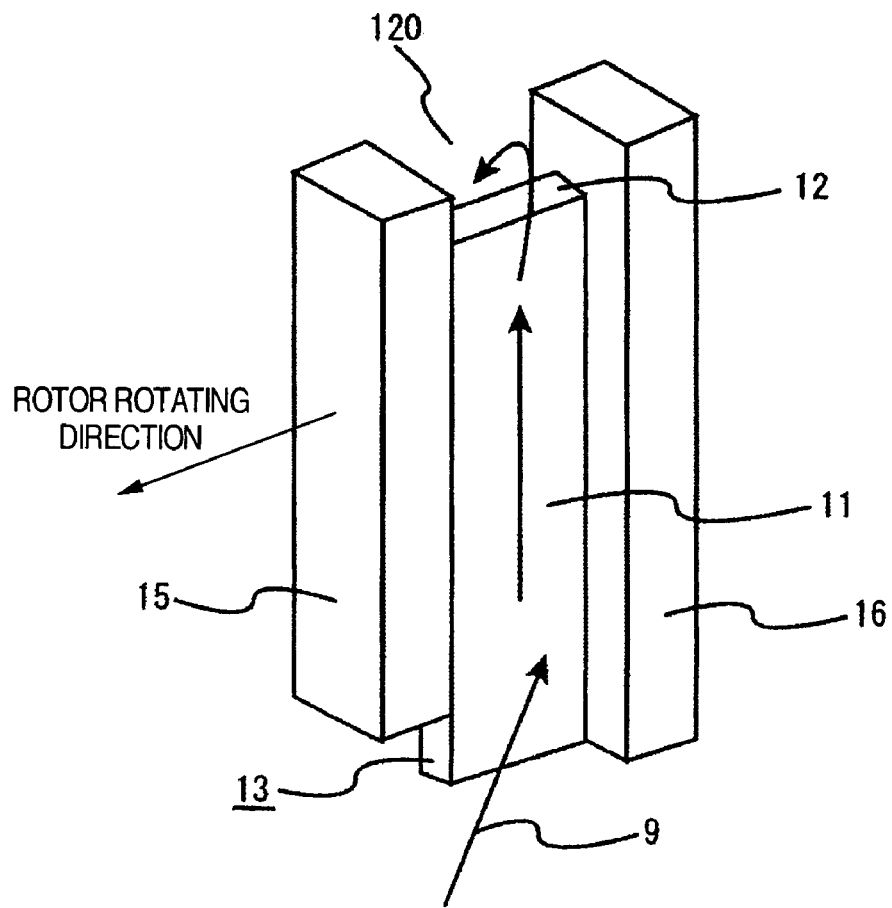
FIG. 4 is an oblique projection view showing a coil support member in an embodiment 2 of the invention.

A second embodiment of the invention is shown in FIG. 4. In this embodiment, a radially inner portion of one of the compressed parts 15 and 16 forming the coil support member 13 is made shorter than the connecting part 12, and a radially inner portion of the other one of the compressed parts 15 and 16 is made at the same radial position as that of the connecting part 12 so that the radially inner portion of the connecting part 12 is exposed.

In such embodiment, a part of the cooling wind collides with the compressed part 15 of a front side in a rotor rotating direction with respect to the compressed part 16 of a rear side in the rotor rotating direction or the compressed part 15 of an upstream side in a cooling air flow direction with respect to the compressed part 16 of a downstream side in the cooling air flow direction so that a flow rate of the cooling wind flowing into the space 11 is increased to accelerate the cooling.

Embodiment 3

Figure 5:
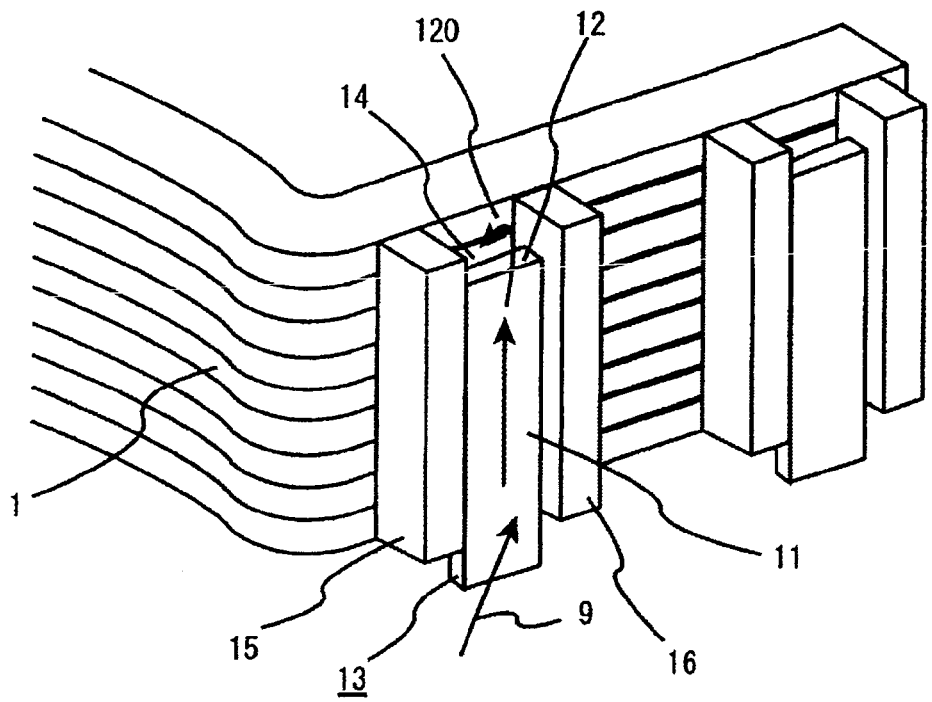
FIG. 5 is an oblique projection view showing the axial end of the rotor coil in an embodiment 3 of the invention.

A second embodiment of the invention is shown in FIG. 5. In this embodiment, the radially inner portions of both of the compressed parts 15 and 16 forming the coil support member 13 is made shorter than the connecting part 12 so that the radially inner portion of the connecting part 12 is exposed.

In this embodiment, the coil support member 13 extends to a radially inner side with respect to the parts of the rotor coil 1 to make the cooling wind collide with the lower portion of the connecting part 12 so that the cooling wind is introduced into the space 11 and the compressed parts 15 and 16 of the coil support member 13 do not restrain an axial flow of the cooling wind toward the coil support member 13 or the like at a downstream side to further improve the cooling performance.

Embodiment 4

Figure 6:
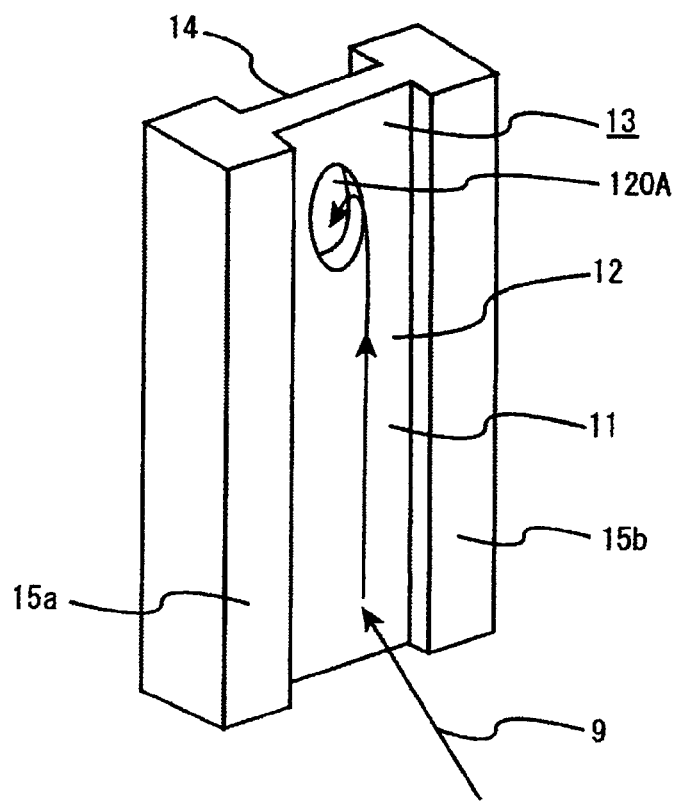
FIG. 6 is an oblique projection view showing a coil support member in an embodiment 4 of the invention.

A fourth embodiment of the invention is shown in FIG. 6. In this embodiment, an outer peripheral surface of the connecting part 12 of the coil support member 13 is the same as that of the compressed parts 15 and 16, and the connecting part 12 has a through hole 120A at a radially inner side with respect to the outer peripheral surface.

In such structure of this embodiment, the cooling performance is improved, and the compressed parts 15a and 15b and the connecting part 12 contact an inner peripheral surface of the retaining ring to increase the mechanical strength effective for the rotary electrical device of a large diameter and high speed.

Incidentally, a plurality of the through holes 120A may be arranged as occasion demands.

Embodiment 5

Figure 7:
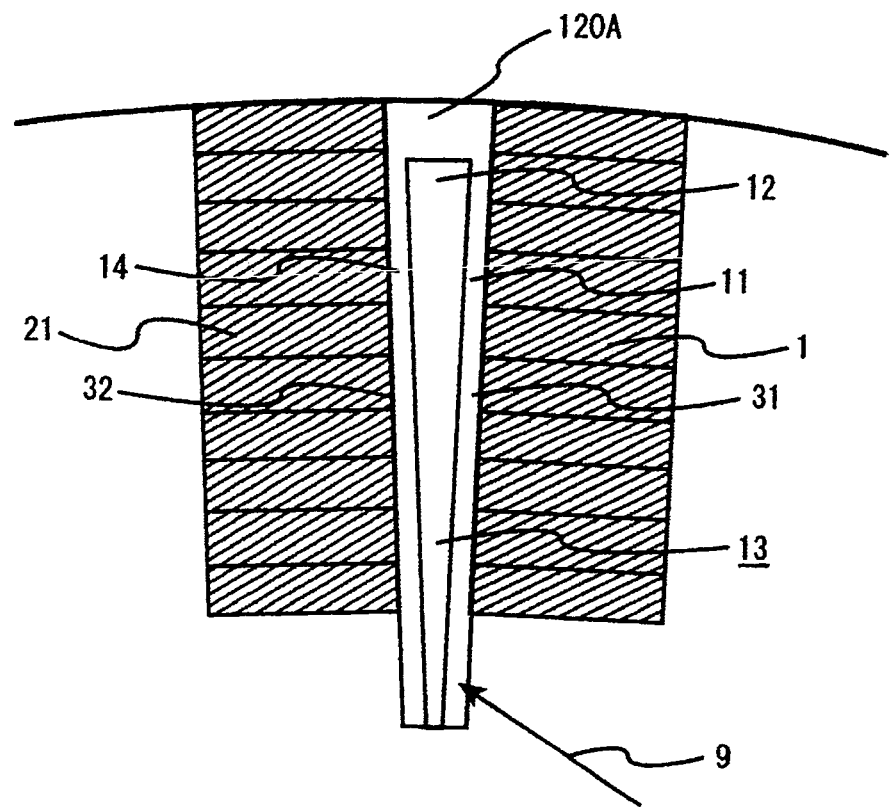
FIG. 7 is a cross sectional view showing the axial end of the rotor coil in an embodiment 5 of the invention.

A fifth embodiment of the embodiment is shown in FIG. 7. In this embodiment, the connecting part of the coil support member 13 has a longitudinal cross section of trapezoid whose width increases in a radially outward direction so that the spaces 11 and 14 are parallel to the coil side surfaces 31 and 32 to make an air flow area constant.

In this embodiment, since the flow areas of the spaces 11 and 14 are constant, a resistance against the flow through the spaces is decreased to improve the cooling performance.

Further, in accordance with a flowing-in direction and a flow rate of the cooling wind 9, a shape of the connecting part 12 may be varied to increase a flow area at an inlet side of the space 11, and when the rotary electrical device is desired to have the identical design irrespective of a rotating direction thereof, a clearance at a radially inner side of the space 11 and a clearance at a radially inner side of the space 14 may be increased.

Embodiment 6

Figure 8:
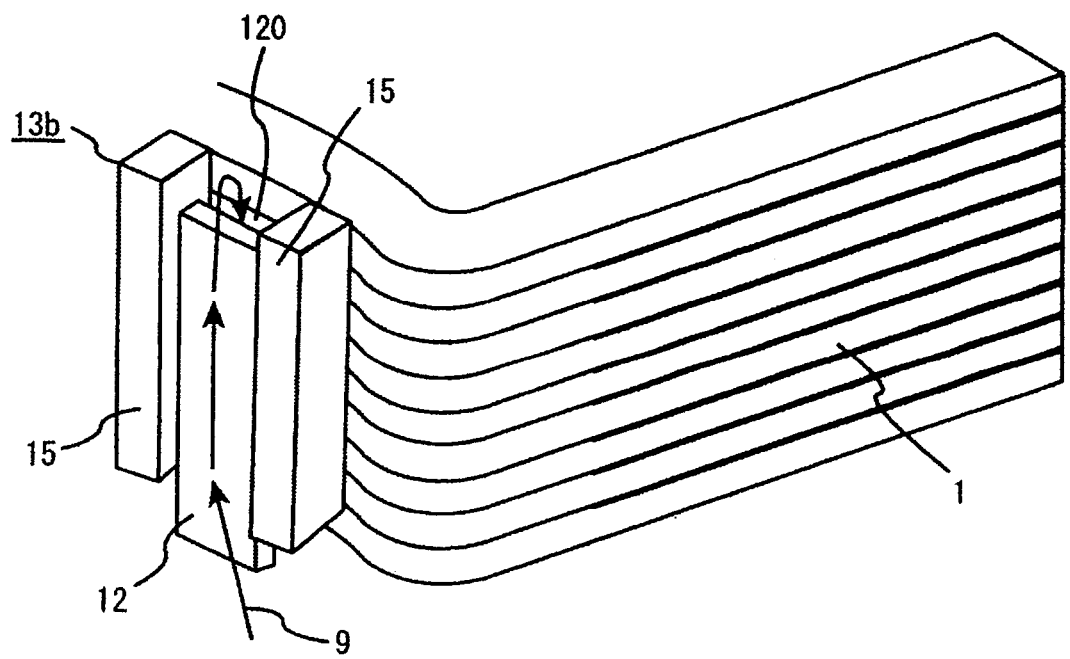
FIG. 8 is an oblique projection view showing the axial end of the rotor coil in an embodiment 6 of the invention.

A sixth embodiment of the invention is shown in FIG. 8. In this embodiment, the third embodiment is used as a circumferential coil support member 13b (shown in FIG. 10) for restraining an axial movement. That is, the support member 13b is arranged between the parts of the rotary coils adjacent to each other axially.

In this embodiment, the support member 13b is used to restrain the axial movement to improve the cooling performance at any position of an axial end.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotor for a rotary electrical device, comprising a rotor core, a coil arranged on the rotor core, and a coil support member arranged between parts of the coil adjacent to each other on the rotor core, wherein the coil support member has two pairs of first surfaces, the first surfaces of each of the two pairs face closely to corresponding ones of the parts of the coil to prevent the parts of the coil from contacting each other and are juxtaposed with each other in a longitudinal direction of the coil, and the coil support member further has a pair of second surfaces facing to respective ones of the parts of the coil, arranged between the first surfaces of respective ones of the two pairs in the longitudinal direction of the coil and indented with respect to the first surfaces of the respective ones of the two pairs to form respective spaces between the second surfaces and the parts of the coil; and wherein a thermal conductivity of a material forming the second surfaces is higher than a thermal conductivity of a material forming the first surfaces.

2. The rotor according to claim 1, wherein the coil support member further has at least one of a notch and a hole arranged between the first surfaces of each of the two pairs to fluidly communicate to both of the spaces.

3. The rotor according to claim 2, wherein a part of each of the second surfaces terminates at a radially inner side with respect to radially outermost ends of the first surfaces of the two pairs to form the at least one of a notch and a hole.

4. The rotor according to claim 1, wherein a part of each of the second surfaces terminates at a radially inner side with respect to radially innermost ends of one of the first surfaces of one of the two pairs and one of the first surfaces of the other one of the two pairs facing to the respective ones of the parts of the coil.

5. The rotor according to claim 1, wherein a part of each of the second surfaces terminates at a radially inner side with respect to radially innermost ends of the first surfaces of the two pairs.

6. The rotor according to claim 1, wherein a material forming the first surfaces is electrically insulative.

7. The rotor according to claim 1, wherein a material forming the second surfaces is electrically conductive.

8. The rotor according to claim 1, wherein a thickness between the second surfaces increases radially outwardly between the parts of the coil whose distance increases radially outward.

* * * * *